Oct. 18, 1966  C. M. HIRST, JR  3,279,559
CUSHIONING AND LOCKING MECHANISM FOR TILT CAB VEHICLES
Filed June 11, 1964  3 Sheets-Sheet 1
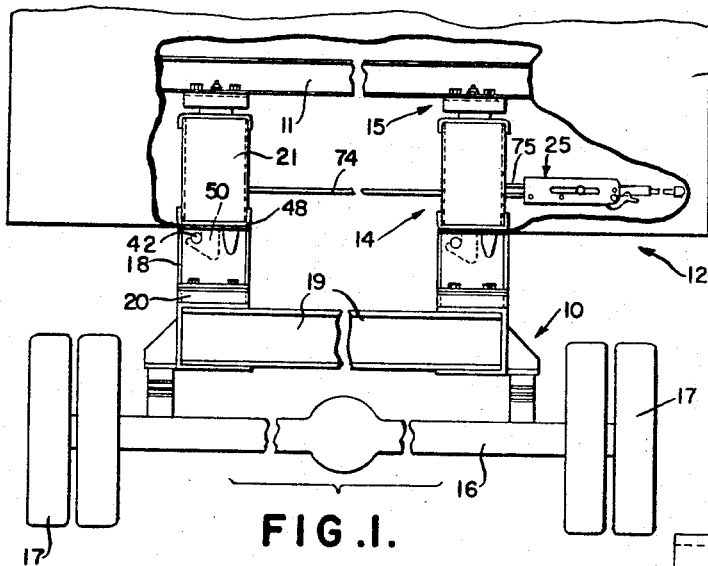
FIG. 1.
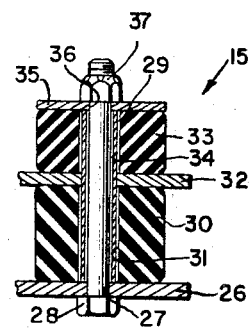
FIG. 2.
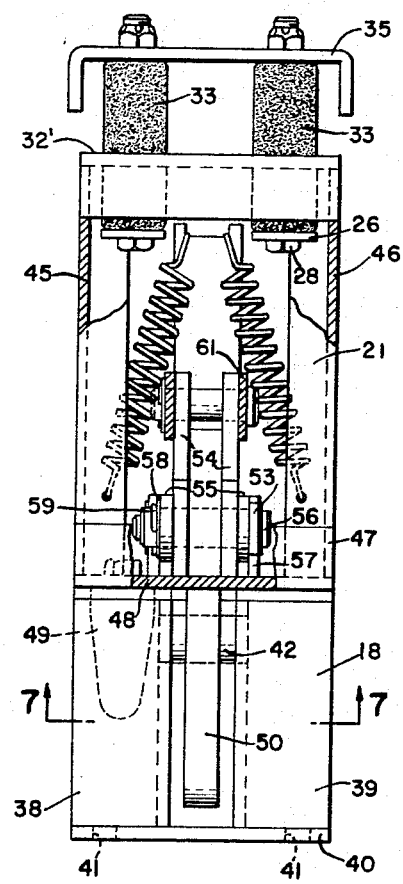
FIG. 5.
FIG. 4.
INVENTOR
Charles M. Hirst, Jr.
BY *H. B. Willson & Co.*
ATTORNEY Oct. 18, 1966  C. M. HIRST, JR  3,279,559
CUSHIONING AND LOCKING MECHANISM FOR TILT CAB VEHICLES
Filed June 11, 1964  3 Sheets-Sheet 2

INVENTOR
Charles M. Hirst, Jr.

BY  H.B. Willson & Co.
ATTORNEY

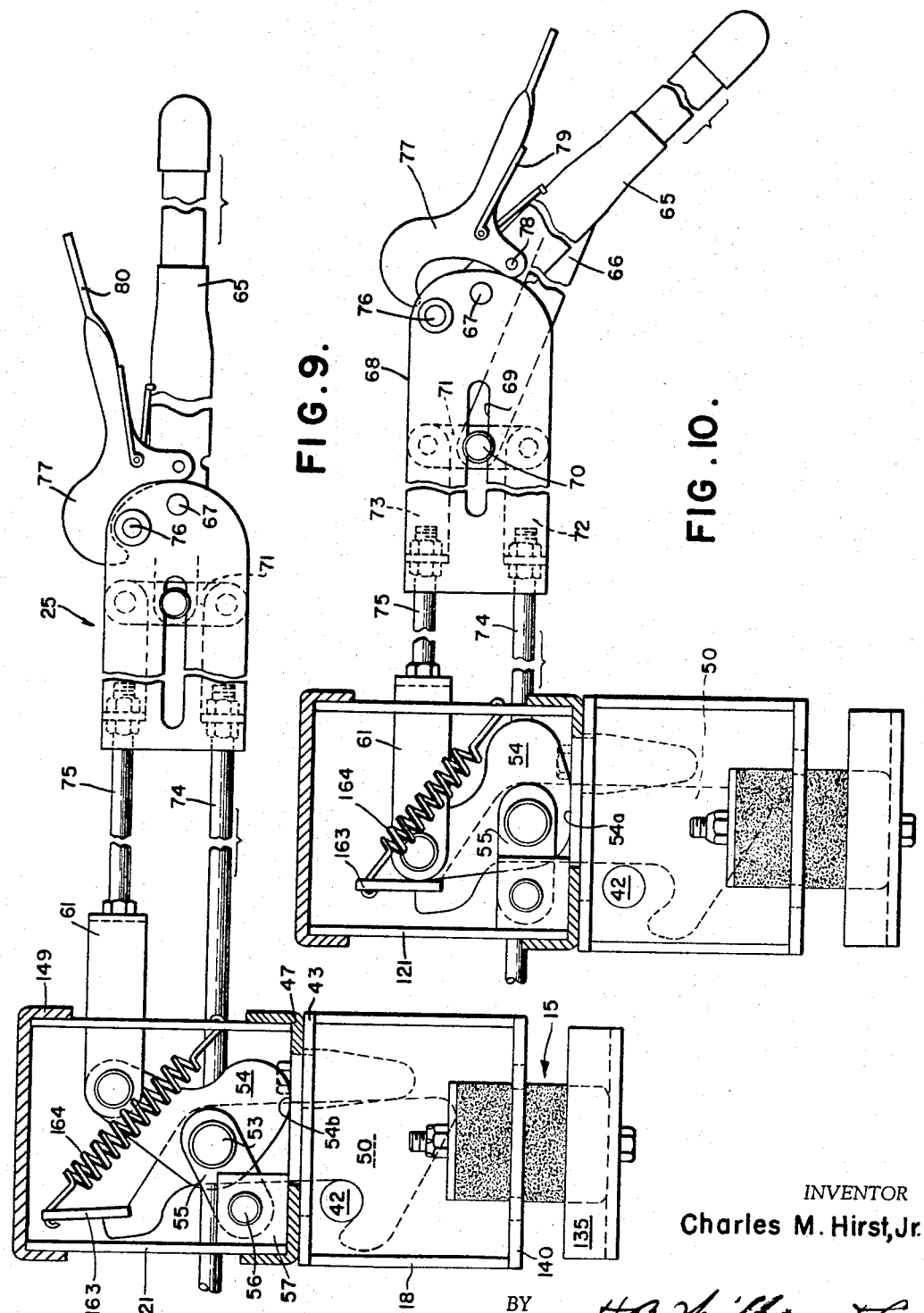

United States Patent Office 3,279,559
Patented Oct. 18, 1966

3,279,559
CUSHIONING AND LOCKING MECHANISM FOR TILT CAB VEHICLES
Charles M. Hirst, Jr., Moberly, Mo., assignor to Orscheln Brake Lever Mfg. Company, Moberly, Mo., a corporation of Missouri
Filed June 11, 1964, Ser. No. 374,377
6 Claims. (Cl. 180—89)

The present invention relates generally to the motor vehicle art, and, more particularly, to a cushioning and locking assembly for a tilt cab type of truck.

A tilt cab truck or tilt cab-over-engine vehicle is a motor vehicle wherein the cab or body and the frame are two separate components and wherein there are provisions at the points of attachment for cushioning the cab or body from road shock. These tilt cab trucks are designed to shorten the wheel base by placing the engine under the driving compartment instead of before it, and also to provide easier access to the engine components for service and maintenance purposes.

The cab on a tilt cab truck has two pivot points at the lower front of the cab area, one on the left front and one at the right front, and these are spaced transversely of the frame and secondary parts thereof are attached to the frame. When a cab is tilted its normal limited tilt level is usually approximately 45° from the horizontal; however, there have been some cases where cabs have been caused to tilt approximately 90° from the horizontal.

When the tilt cab on a vehicle is in normal horizontal or driving position the rearward edge or back of the cab and its lower area is attached to the chassis frame in a combination which uses cushioning bumpers of springs or rubber construction and the cab itself is locked to the frame, usually with a locking device which provides preloading compression on the rubber or spring bumpers. In addition to this locking device there is also a safety hook in case of failure of the locking device. This type of cab construction although very much desired by the trucking industry due to its flexibility and wheel base advantages as well as its ability to create easy maintenance of the engine components, has many disadvantages because of its cushioning and locking mechanisms.

For example, in the controls for tilt cab locking mechanisms two or more handles are required usually one for the locking mechanism and another for the safety hook. This requires an operator to employ a two step or a three step operation in order to ensure that all devices are in their proper places for road operation. Usually there is a secondary operation required to actuate a safety that will guarantee that the locking mechanism operating lever is locked in its own or locked position, and in some cases this feature is even not included, although where it is included a secondary operation to provide the locking is needed.

In many cases the work load of the hook is transmitted directly to the operating handle and this requires a much more stable, heavier, and therefore more costly operating mechanism to withstand the entire loading of the shock load on the cab itself.

In many cases one hook is used as a lock and another hook is not locked but merely surrounds a pin as a secondary safety and is operated by second lever. In some cases both sides have locking units and the operator is required to walk around the truck and lock or unlock each one independently of the other.

When the hook is in its locked position the cushioning material between the cab and the frame is compressed causing a resilient condition and it is usually compressed to a preloading of approximately 600 pounds. The effect this creates is that when the vehicle hits a chuck hole or the like in the road, the cab will continue to compress the cushioning material even more and cause the hook to drop slightly away from the pin to below 0 loading, and when the hook recontacts the pin on recoil, the shock loading is as high as 10,000 pounds. Because of the shock loading that the structural members must take they are required to be heavier than is necessary to take normal riding loads due to the shock loading imposed on them at frequent intervals.

With these defects of the prior art in mind, it is a main object of the present invention to provide a locking mechanism and cushioning device for tilt cab vehicles which provides cushioning both on initial shock load and upon recoil and which also provides a positive locking with rigid part-to-part or metal-to-metal contact.

Another object of the invention is to provide an operating handle for operating two or more locking devices simultaneously by a single lever which can place the device into its released position, a safety or idle position, and its locked position.

A further object of the invention is to provide a device of the character described wherein automatic latch means are provided to assure that the locking or locked control lever remains in locked position until physically released by an operator.

Still another object of the invention is to provide an intermediate or cam mechanism in the structural area of the locking hook so as to take the work load of the locking mechanism between the cab and the frame so that the operating handle need only carry a light load to maintain this mechanism in locked condition.

Still a further object of the invention is to provide a locking assembly of the character described wherein an equalizer is provided for evenly distributing the forces to each of the lock mechanisms so that the locking and unlocking of each mechanism takes place at the same time.

Yet another object of the invention is to provide a locking mechanism of the character described wherein there is metal-to-metal contact so that the connection between the hook and pin is incompressible and therefore does not react to shock loading or unloading and maintains constant tension.

Yet a further object of the invention is to provide a cushioning arrangement wherein the members are compressed in a captured preload condition which provides cushioning for both the coil and the recoil.

A still further object of the invention is to provide a device of the character described wherein the structural support members for the tilt cab lock can be reduced in size because of elimination of the excess of loadings such as the recoil action which previously had disturbed them.

These objects and others ancillary thereto are accomplished in accordance with preferred embodiments of the invention wherein a locking mechanism is provided which includes a hook assembly which is the upper assembly and a pin assembly as the lower assembly. The upper hook assembly is attached to the cab and the lower assembly is attached to the chassis. When the hook and pin are engaged the members of their assemblies abut in metal-to-metal contact so that they are firmly held together and can not separate except upon release.

A special cam mechanism is provided for raising and lowering the hook so that the hook member itself need not be subjected to heavy loads. A special type of latching arrangement is provided with a single lever which can operate the hook into three positions relative to the pin. In one position of the lever the cam provides a camming action and causes the hook to tightly engage the pin to lock the parts together. In a second position of the lever the cam is in its relaxed position and the hook and pin are aligned with the hook below the pin. The third position of the lever causes movement of the hook laterally of the pin so that the members can be completely released. As a safety measure, the hook is biased into position wherein it is in alignment with the pin. This operating lever is provided with a safety latch so that it can not be moved from its locked position except when the latch is first released.

A cushioning member is provided which is adapted to have an upper and a lower pad whereby there is not only cushioning of the initial shock load but also cushioning of the recoil. The cushioning member can have an adjustable amount of preloading and can either be attached between the pin and the chassis frame or if desired it instead can be attached between the hook and the cab frame.

Additional objects and advantages of the present invention will become apparent upon consideration of the following description when taken in conjunction with the accompanying drawings in which:

FIGURE 1 is a schematic rear elevational view, partly in section, of a tilt type cab-over-engine truck.

FIGURE 2 is a vertical sectional view through the cushioning device per se.

FIGURE 4 is a side elevational view, partly in section, of one arrangement of the combined cushioning and locking device for trucks.

FIGURE 5 is an elevational view, partly in section, of the device of FIGURE 4 as viewed from the left.

FIGURE 9 is a side elevational view, partly in section, of a further form of the present invention showing the means for operating the locking assembly and wherein the locking assembly is in its locked position.

FIGURE 10 is a side elevational view, partially in section, similar to FIGURE 9 illustrating the device in its idle or safety position.

With more particular reference to the drawings, FIGURE 1 shows the rear of a tilt type cab-over-engine vehicle wherein a chassis 10 is provided on which a cab 12 is mounted for pivotal movement, the pivoted connection being disposed at the front lower end of the cab and therefore is not visible in FIGURE 1 since this is a rear view of the cab. A lock assembly 14 is used for securing the end of the cab 12 to the chassis 10. Also, a cushioning or shock absorbing device 15 is provided at the upper end of the lock assembly 14 and thus the cushioning assembly is provided between the chassis 10 and the cab 12.

Figure 3:
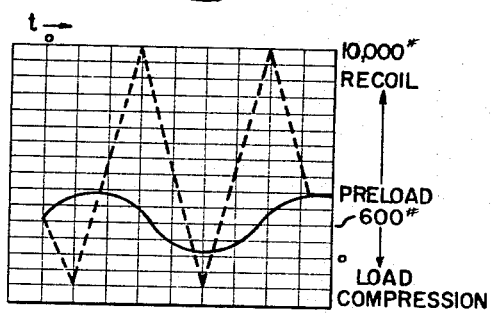
FIGURE 3 is a graph comparing the load compression and recoil of prior art devices in dashed lines and the present invention in solid lines.

In order to more clearly understand the purpose of the present invention, the load problems of the prior art devices need be more fully understood. In the graph of FIGURE 3 the dashed line indicates the load to which the lock assembly is subjected. At time 0 it is assumed that the vehicle has encountered a bumpy road. Assuming that the normal shock absorbing or cushioning means has a preload compression of 600 pounds, the shocks from the bumpy road can cause this preload to go below 0 so that there is load compression. Then, immediately after this reaction occurs in the opposite direction and at this point the recoil can assume values of up to 10,000 pounds. Since, in the prior art devices, the cushioning was between the hook and the pin, the hook and pin could become slightly disengaged during the time that the preload is removed because of load compression. Then, upon recoil the hook will strike the pin at a force of 10,000 pounds. This can substantially damage, and/or weaken the hook and pin and is obviously not good either for the vehicle or for the driver and passengers. Also, these jolts can be felt by the driver and may cause him to be very uneasy when travelling over a bumpy road and thereby adversely affect his manner of driving.

Referring again to FIGURE 1, it should be noted that the cab 12 includes a cab frame 11 about which is mounted a cab shell 13 of sheet metal or the like. The chassis 10 includes a frame 19 which is mounted upon an axle 16, in turn, mounted upon wheels 17. At this rear portion of the cab as shown in FIGURE 1, the locking device 14 is provided between the chassis frame 19 and the cab frame 11. This lock includes a lower or pin box section 18 which includes a locking pin or cab lock tie-down pin 42 and an upper or hook box assembly 21 from which depends a cab hook 50 which, as shown in FIGURE 1, engages the pin 42 in order to lock the devices together. As can be seen from FIGURE 1 the upper portion of box assembly 18 is provided with an upper plate 43 and the lower portion of upper box assembly 21 is provided with a lower plate 48. These plates 43 and 48 abut against one another when the hook 50 is locked onto pin 42 so that there is always metal to metal and rigid contact between the hook and lock. Also, a cushioning assembly 15 is provided, and this cushioning assembly is connected between the upper box assembly 21 and the cab frame 11. Single lever actuating means 25 are provided for locking and unlocking the device into various positions as will be described in more detail below.

As shown in FIGURE 2 the cushioning device is constructed of a lower mounting pad retainer plate 26 having a small bolt opening 27 therein. A mounting pad retaining bolt 28 is disposed through the opening 27 and the head of bolt 28 engages the lower surface of lower mounting pad retainer plate 26. A mounting pad bushing 29 which is in the form of a sleeve passes over the length of bolt 28. A lower mounting pad 30 of rubber or some similar type of resilient or yieldable cushioning material is provided and has a central opening 31 so that the pad can be disposed about the bushing 29. A mounting pad support bracket 32 is provided and has a central opening which engages bushing 29 with closer tolerance than does the pad 30. An upper pad 33 of similar construction to the pad 30 is provided above the support bracket 32 and this pad also has an opening 34 for allowing the pad to surround bushing 29. As can be seen the upper and lower pads 33 and 30, respectively, are provided with openings to provide some clearance between the inner surface of these openings and the outer surface of the bushing. The uppermost retaining member in this assembly is the upper mounting bracket 35 which has a bolt opening 36 therethrough but which opening is smaller than the diameter of bushing 29 so that the bushing is firmly held in place. A self-locking nut 37 is disposed over the end of the bolt so as to lock the assembly tightly in place. It should be noted that the elements 26, 32, and 35, can be various portions of the device and may not be separate plates. They have been described as separate plates only for use as a convenience in describing the assembly per se. For example, the upper mounting bracket 35 may actually be a part of the cab frame.

There is no restriction as to the number of mounting pads which could vary greatly and could be composed of innumerable variations of rubber and rubber-like products.

With reference again to the graph of FIGURE 3 the solid line illustrates the loading of the device of the present invention when a bumpy road is encountered. In this device it can be seen that the extremes of the prior art devices are softened because of the fact that there is shock absorbing in two directions because of the use of an upper and a lower pad. Also, there can be no shocks between the hook and the pin since they are always firmly engaged together and can not be slightly displaced with respect to each other due to compression of some shock absorbing means as had been done in the prior art devices. Accordingly, the great strains and stresses to which these devices had previously been subjected are thereby removed from the hook and pin.

FIGURES 4 through 7 disclose one embodiment of the invention. The lower box assembly 18 is constructed of two slightly spaced riser members 38 and 39 which are U-shaped channel members. These riser members are connected to a lower mounting bracket 40 which is provided with openings 41 therein for attachment purposes, for example, attaching this member to the chassis frame or to a riser frame 20 (see FIGURE 1) which may be of any suitable height so that the lock assembly properly fits between the chassis frame and the cab frame. A pin 42 is connected between the bight portions of the U-shaped risers 38 and 39, and this is a cab lock tie-down pin and must therefore be securely mounted in place so as to resist the stresses and strains to which it will normally be subjected during use. Thus, with the construction of the lower box assembly 18 of two slightly spaced risers 38 and 39, the hook can move between these two risers so as to engage the pin 42.

A guide pin locator plate or base pin plate 43 is provided as the upper plate of the lower box assembly and has a locator or guide opening 44 therein for a purpose which will be described below. The pin assembly base plate 43 is provided with a slot centrally thereof so as to allow passage of the hook down into the lower box assembly 18 as well as movement of the hook to the left and to the right as viewed in FIGURE 4.

The upper box assembly 21 is constructed of two U-shaped channel members 45 and 46 in a similar fashion to the lower box assembly; however, in this upper box assembly the U-shaped members face toward each other instead of facing away from each other. As can be seen from FIGURE 5, the cross section of members 45 and 46 is such that there are short legs which face inwardly to form the U of the U-shaped cross section.

A hook assembly base plate 47 is provided which is also U-shaped so as to have two upstanding flanges and a horizontally disposed portion. The horizontally disposed portion 48 is provided with an opening centrally thereof so as to allow suitable movement of the hook to engage the pin. Also, this horizontal plate 48 carries a guide pin 49 which is suitably secured thereto, and this guide pin is tapered so as to fit within opening 44 to properly guide two box assemblies into engaging position so that there will be proper positioning of the two assemblies before locking takes place. In the abutting position of the two box assemblies, the locator pin or guide pin 49 is disposed in opening 44 and the horizontal or hook base plate 48 is in engagement with the pin base plate 43 so as to provide metal-to-metal contact and positive and firm locking.

Figure 6:
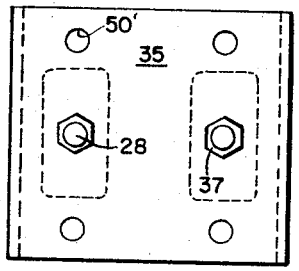
FIGURE 6 is a plan view of FIGURE 5.
Figure 7:
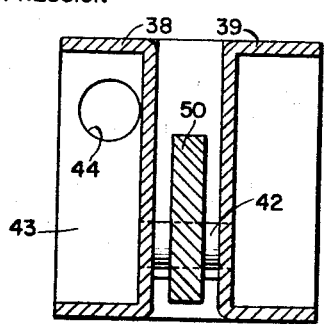
FIGURE 7 is a horizontal sectional view taken substantially along the plane defined by reference line 7—7 of FIGURE 5.

A similarly U-shaped hook top plate 32' is provided at the top of the box assembly and the horizontal portion of this plate 32' can be considered to be the mounting pad support bracket 32 of FIGURE 2. The lower mounting pad retainer plate 26 is also visible in this figure of the drawing and as are the upper pads 33, the bolts 28, and the upper mounting bracket 35 which, as shown in FIGURE 5, is generally U-shaped in cross section or from a side view but is generally square in plan view as shown in FIGURE 6. Moreover, a plurality of mounting openings 50' are provided through the plate so that they can be bolted to frame 11 of the cab or some suitable place.

The cab lock hook 50 is also provided in the upper assembly 21 and is provided with a hooking recess 52 for engaging the pin 42 as well as a cam surface 51 disposed opposite the hooking recess 52 for a purpose which will be described below. The hook is pivotally mounted to a cam pivot pin 53 which not only passes through the hook 50 but also through a cam 54, which is generally in the shape of a bell crank lever, and through cam pivot links 55. The other ends of the cam pivot links 55 are pivotally mounted on a pivot link pin 56 which is disposed in bearing blocks 57.

This assembly is held together and allowed to have pivotal movement. It is constructed with a cam pivot pin washer 58 which is held in place by a cam pivot pin cotter key 59. Also, the pivot link pin has a washer and it too is held in place by a cotter key. A yoke pin 60 is provided at the top of the cam 54 and a yoke 61 is attached to this pin and this yoke 61 is attached to the actuating rod as will be described in further detail below.

Figure 8:
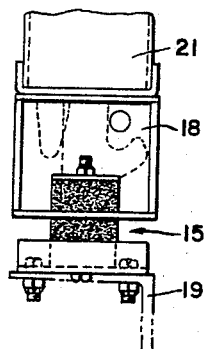
FIGURE 8 is a fragmentary elevational view of another relative arrangement of the cushioning and locking means of the present invention.

The upper end of hook 50 is provided with an off-set portion 62 from which a spring mounting plate or extension bar 63 extends upwardly, and the upper end of it is attached to one end of a cam lock retaining coil spring 64. The other end of the spring is attached to the frame of the box assembly. The use of the extension bar provides additional leverage. Thus, the construction of the lock arrangement has been described for the embodiment wherein the cushioning means 15 are provided between the upper box assembly 21 and the cab frame 11. However, as shown in FIGURE 8, this cushioning assembly 15 can also, if desired, be provided instead between the lower or pin box assembly 18 and the chassis frame 19.

The detailed operation of the device will now be described in connection with FIGURES 9 through 11 in which it will be seen that the arrangement with the cushioning means between the pin box assembly and the frame chassis is used and wherein a single actuating means 25 is used for actuating two lock assemblies which are connected as shown in FIGURE 1. It should be noted here that although two lock assemblies are shown and are usually preferred, it is quite possible to use any number of lock assemblies desired, for example, only one may be used.

Figure 11:
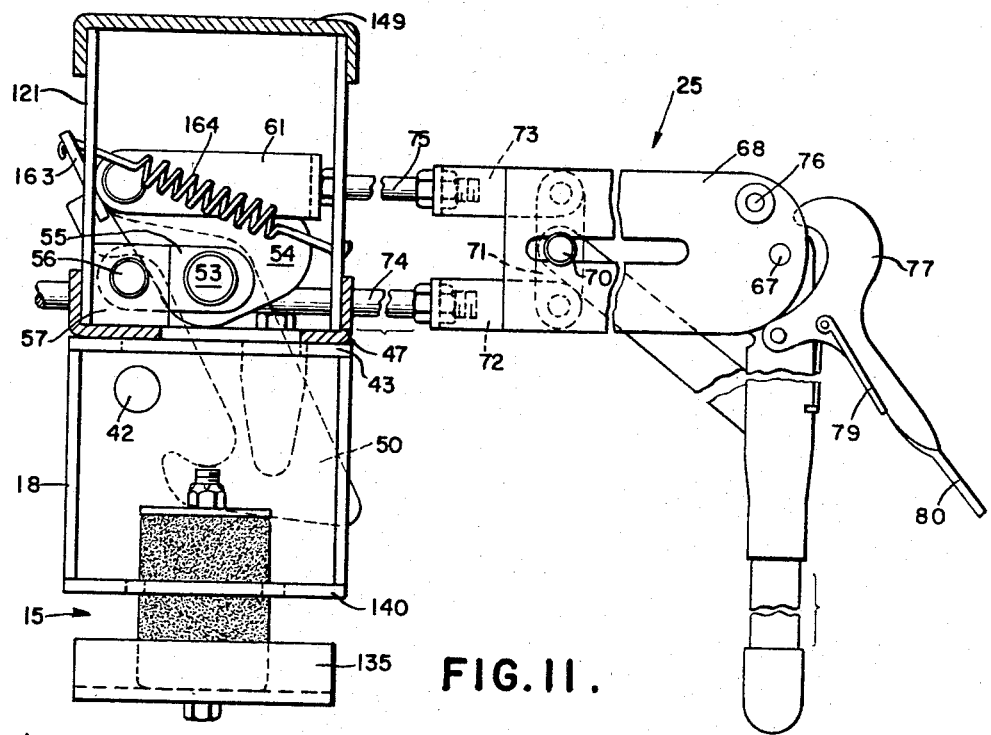
FIGURE 11 is a side elevational view, partly in section, of the device shown in FIGURE 9 illustrating it in its released position.

In the embodiment of FIGURES 9 through 11, the same elements will be designated with identical reference numerals, and those elements which are somewhat changed will have the same digits preceded by a one. Thus, the upper box structure in this embodiment is designated 121 and as can be seen is relatively shorter than in the previous embodiment because of the fact that the hook extension bar 163 is shorter than the similar bar 63 in the previous embodiment. Accordingly, the coil spring 164 is somewhat shorter. In addition, the top member of the box structure 149 closes the box structure and need only be provided with openings for attaching it to the cab frame but forms no part of the cushioning means 15 as it did in the previous embodiment. Regarding the lower box structure 118, its lowermost mounting member 140 now is the equivalent of the mounting pad support bracket 32 of FIGURE 2 and the member which has previously been the upper mounting member 35 is now the lower mounting member 135, although it may be of similar construction. Thus, the cushioning means 15 is basically the same but some of the elements are attached in a different manner to the locking assembly and to the truck itself.

The operating lever assembly 25 includes a control lever or handle 65 to which an actuating lever 66 is attached. The control lever 65 is pivoted at 67 to a housing 68. The general operation of this lever will not be described in detail because it is sufficient to indicate that this is the type of Orscheln lever which is disclosed in U.S. Patents Nos. 2,171,403 and 2,464,096, and particularly the type shown in FIGURE 2 of the latter patent. The body 68 is provided with a slot 69 in which a pin 70 slides. An equalizer bar 71 is attached to the pin 70 and is arranged to be at right angles to the direction of the slot 69. Connecting levers 72 and 73 are provided one at each end of the equalizer bar 71 and the ends of these are connected by suitable bolt and nut means to control rods 74 and 75, respectively. The control rod 75, for example, is connected to the yoke 61 of the locking assembly which is near the actuating means 25 whereas the yoke for the control rod 74 is not shown in FIGURES 9 through 11 but is attached to this rod and is for operating that locking mechanism which is farther from the operating means 25, as shown in FIGURE 1.

The housing 68 is also provided with a retainer pin 76 which cooperates with a latch 77 pivoted to the operating lever 65 at 78. This latch is spring biased by a spring 79 in a counter-clockwise direction as viewed in FIGURE 10. Thus, when the control lever 65 is in its horizontal position as shown in FIGURE 9, the latch 77 engages the retainer pin 76 and the spring 79 urges it into its locked position. The control lever 65 can not be moved from this position unless the handle portion 80 of latch 77 is first moved against the force of spring 79 and thus toward the handle 65 so as to disengage the latch from the retaining pin 76. Only then, can the handle 65 be moved downwardly into a position as shown in FIGURE 10, for example. Thus, safety locking means are provided so that there can not be accidental unlocking of the device.

As shown in FIGURE 10, the device is in its idle or safety position which is similar to the position of FIGURE 4. To be placed into the safety position the latch 77 must be released and the control handle 65 moved into the position shown in FIGURE 10, wherein it is at about a 45° angle with the horizontal. In this position the actuating lever 66 moves equalizer bar 71 toward the left in slot 69 so that control rods 74 and 75 are also moved toward the left. This moves the yoke 61 toward the left which rotates the cam 54 so that portion 54a along its cam surface engages plate 48 where the link pin 55 may assume a horizontal position and the hook 50 is then in vertical alignment with pin 42, that is vertically spaced therefrom. Thus, although the device is not locked in this position, the cab still can not be tilted upwardly since an upward movement of the cab would move box assembly 121 upwardly with it and this would cause the hook 50 to engage pin 42. For this reason it is called the safety position.

To move from the safety position to the locked position, the handle 65 is moved into its horizontal position shown in FIGURE 9 wherein the control rods 74 and 75 are moved toward the right. The yoke 61 is also moved toward the right and the cam 54 is moved about pivot 53 at the end of pivot pin 55 and the toe 54b of cam 54 engages the base plate 48 so that the pivot point 53 is moved upwardly from its safety position and the hook 50 moves upwardly until it engages pin 42. In this position it should be noted that the latch 77 engages the retaining pin 76 so that the device is safely held in locked position.

The completely released position is shown in FIGURE 11 wherein the control handle 65 has been moved to a vertical position and the equalizer bar has been moved to the left end of slot 69 and thus the control rods 74 and 75 have been moved to their leftmost position. In this position the hook extension bar 163 actually projects outwardly of the confines of the box structure 121. The movement of the hook extension bar 163 toward the left is caused by the engagement of the end of yoke 161 with the extension bar 163. The cam 54 moves slightly in a counterclockwise position but the link 55 still maintains the substantially horizontal position. Because of the movement of the hook extension bar 163 toward the left the hook 50 which is on the opposite side of the pivot pin 53 moves toward the right so that the end of the hook is vertically clear of the locking pin 42. In this position, it can be seen that if the box assembly 121 is moved upwardly the hook will be free of pin 42 so that tilting of the cab may take place. It should be noted that in this position the coil spring 164 is under tension and that upon release of the handle 65 the device automatically moves back to its safety position of FIGURE 10. However, if the cab has first begun its tilting movement the release of the handle 65 can take place after the hook 50 has cleared pin 42.

Then, upon lowering the cab into position the cam surface 51 on the hook will engage pin 42 as the hook moves downwardly with the cab, and this will cam the hook outwardly away from pin 42 and toward the position of the hook as shown in FIGURE 11. When the end of the hook has cleared pin 42 the spring will pull the hook back into the position shown in FIGURE 10 so that when the cab is placed down into proper position the hooking device will automatically assume its safety position.

Thus, it can be seen that there has been disclosed a device which accomplishes all of the aforementioned objects. The device provides a reciprocal cushioning effect on the operative parts of the cab lock mechanism when it recoils from the compression loading on the upper mounting pads caused by road shock beyond the normal static conditions. The pads are constructed of a compressible substance such as rubber which is designed to be capable of absorbing the shock produced by the vibration, torsion and other loads which are imposed by gravity, road shock, and inertia caused by both acceleration and deceleration. Thus when the vehicle hits a bump, or any other type of vibration is transmitted through the chassis toward the cab, the rubber mounting pads absorb the road shock to a large degree.

Every action has a reaction and in this case resistance to the reaction is also provided by rubber mounting pads whereas previously there was metal to metal shock loading. Thus, in the present invention the reverse stresses are absorbed by rubber pads similar to the direct stresses, and at the same time a secure metal to metal lock is provided. When there is a shock induced by a downward movement of the cab or upward motion of the frame, this is absorbed to a large extent by the mounting pads of which there can be one or more. The shock imposed by an upward motion of the cab or downward motion of the frame is absorbed to a large extent by the lower pads. This system of padding for shock loads in both directions provides for more cab comfort and reduces the highly dangerous shock loads which occur in the presently used locking hook and pin arrangements, while also providing a means of rigidly locking the upper and lower sections together.

The operating handle is provided to be of the lever type having an equalizer so that the forces applied to the operating handle are distributed evenly to each of two locking and hook mechanisms which are utilized. If one unit for the lock or release position gets to the end of its travel first, it automatically stops and allows the operator's efforts to transfer to the opposite mechanism, causing both to arrive at the full extent of their travel. As mentioned previously, only one lock mechanism could be used if desired as could a larger number than two if needed. Furthermore, the lock mechanism with or without the cushioning means can be produced as separate units which can later be attached to the cab and chassis frames of trucks. Instead of using the lever-actuated operating handle, a crank-type device or some other suitable means could be used.

Also, it should be noted that in the cushioning device the bearing sleeve therefor is made to be somewhat shorter than the heights of the two pads with the plate between them so that in order to secure the members tightly together the nut on the end of the bolt must be tightened so that the pads are placed under preload conditions.

It will be understood that the above description of the present invention is susceptible to various modifications, changes, and adaptations, and the same are intended to be comprehended within the meaning and range of equivalents of the appended claims.

What is claimed is:
1. In a tilt cab truck of the type having a truck chassis, a tilt cab, and two spaced lock means for holding them together, the improvement wherein each lock means comprises:
   means connected to the cab frame and including a rigid lower plate, and a hook movable relative to said plate;

means connected to the chassis frame and having a pin cooperable with said hook to selectively lock and unlock the cab frame and chassis frame with respect to each other and including a rigid upper plate positioned to engage said lower plate when the cab frame and chassis frame are locked;

resilient means for connecting one of said above mentioned means with one of said frames for absorbing shocks in two opposite directions; and lock control means including a single lever operable between a locking position where the hook engages the pin, an idle position where the hook and pin are aligned but spaced from one another, and a released position where the hook and pin are free of one another, said lock control means including a pair of control rods corresponding ends of which are connected with the hook members of said lock means, respectively, and equalizer bar means connected with the other ends of said control rods for actuation by a single lever.

2. A lock assembly for locking a tilt-type cab frame in a closed position relative to a chassis frame, comprising, in combination pin lock means adapted for connection with one of said frames and including a rigid first box section having vertical walls, a horizontal first plate secured to said vertical walls and containing a first opening, and a horizontal pin secured between an opposed pair of said walls adjacent said opening;

hook lock means adapted for connection with the other of said frames and including a rigid second box section having a horizontal second plate containing a second opening, a generally vertical hook member extending through said second opening, pivot means connecting the hook member with the second box section, spring means pivotally biasing said hook member in a given direction relative to said pivot means, said hook member including a hook portion external of said second box section, said pin and hook lock means being so arranged that when said cab is in the closed position, said plates are in contiguous surface-to-surface engagement and said hook portion extends through said first opening for locking engagement with said pin;

cushioning means connected with one of said lock means for interposition between said lock means and the corresponding frame for cushioning shocks in two opposite directions;

and operating means including cam means and a single lever for successively displacing said hook member betwen locked, idle and fully released positions relative to said pin, said hook member, when in the idle position, being arranged with the hook portion thereof spaced from, but in vertical opposed alignment with, said pin, said spring means normally biasing said hook member from said fully released position toward said idle position.

3. Apparatus as defined in claim 2 wherein said cam means includes a cam in continuous engagement with said second plate, and further wherein said pivot means comprises at least one pivot link pivotally connected at one end with both said cam and said hook member, and pivotally connected at the other end with said second section, said cam having an elongated portion for vertically displacing said hook member relative to said second plate to cause movement of said hook member from the locked position to the idle position.

4. Apparatus as defined in claim 3 wherein said hook member includes an extension bar extending from the opposite side of said pivot means from said hook portion, and further wherein said operating means includes a yoke connected with said lever for selectively engaging the hook extension bar to move the hook laterally of the pin from the idle position to the fully released position.

5. In a tilt cab truck of the type having a truck chassis, a tilt cab, and lock means for locking said cab to said chassis, the improvement wherein said lock means comprises hook means connected with the cab frame and including a rigid lower plate, and a hook member movable relative to said lower plate;

pin means connected with the chassis frame for cooperation with said hook means to selectively lock and unlock the cab relative to the chassis, said pin means including a rigid upper plate positioned to engage said lower plate when the cab frame and chassis frame are locked, and a pin fixed relative to said upper plate;

resilient means interposed between one of the hook and pin means and the corresponding frame for absorbing shocks in two opposite directions; and lock control means for selectively moving the hook between a first position in engagement with said pin, a second position wherein said hook and pin are vertically aligned but vertically spaced, and a third position wherein the hook and pin are both vertically and horizontally spaced, said lock control means including an operating lever, and a cam lever connected between said operating lever and said hook, said cam lever having a cam profile by means of which it is continuously supported on the upper surface of said lower plate.

6. The improvement as defined in claim 5 wherein said resilient means includes a support bracket connected to said one corresponding frame, an upper cushioning pad above said bracket, a lower cushioning pad below said bracket, a bearing sleeve passing through said pads and said bracket, a bolt disposed in said sleeve, an upper retaining plate on said upper pad and through which only said bolt passes, a lower retaining plate on said lower pad and through which only said bolt passes, and a nut on each bolt for holding the parts together and for preloading said pads.

References Cited by the Examiner

UNITED STATES PATENTS

| | | | |
|---|---|---|---|
| 2,740,487 | 4/1956 | Murty et al. | 180—89 |
| 2,741,507 | 7/1956 | Ambli | 292—113 |
| 2,939,541 | 6/1960 | Smalley | 180—89 |
| 2,943,693 | 7/1960 | Norrie | 180—89 |
| 3,080,191 | 3/1963 | Schmidt et al. | 296—35 |
| 3,112,950 | 12/1963 | Jaskowiak | 296—35 |
| 3,184,262 | 5/1965 | Mintz | 180—89 X |

FOREIGN PATENTS 326,464   2/1958   Switzerland.

KENNETH H. BETTS, *Primary Examiner.*